United States Patent [19]

Wilson

[11] Patent Number: 4,791,778
[45] Date of Patent: Dec. 20, 1988

[54] CORN HEAD GEAR BOX
[75] Inventor: Ronald E. Wilson, Lee's Summit, Mo.
[73] Assignee: Deutz-Allis Corporation, Milwaukee, Wis.
[21] Appl. No.: 151,953
[22] Filed: Feb. 3, 1988
[51] Int. Cl.$^4$ .................. A01D 45/02; A01D 69/00
[52] U.S. Cl. .......................................... 56/106; 56/98; 56/DIG. 6
[58] Field of Search ............... 56/98, 106, 105, 104, 56/14.2, DIG. 6

[56] References Cited
U.S. PATENT DOCUMENTS

| | | |
|---|---|---|
| 3,589,110 | 6/1971 | Schreiner et al. ............... 56/11.7 |
| 3,759,021 | 9/1973 | Schreiner et al. ............... 56/106 |
| 3,832,836 | 9/1974 | Anderson ........................ 56/104 |
| 3,858,384 | 1/1975 | Mirste et al. ................... 56/14.2 |
| 4,227,366 | 10/1980 | Pucher ........................... 56/106 |
| 4,249,366 | 2/1981 | Dolberg et al. ................. 56/98 |
| 4,269,017 | 5/1981 | deBuhr et al. .................. 56/106 |
| 4,434,606 | 3/1984 | Rhodes et al. .................. 56/106 |

Primary Examiner—Paul J. Hirsch
Attorney, Agent, or Firm—Charles L. Schwab

[57] ABSTRACT

Three versions of a gear box for a combine corn head are illustrated. The gearing to drive a pair of snapping roll shafts and a pair of gathering chain drive shafts are housed in two casings releasably secured to one another in an end-to-end relationship.

9 Claims, 2 Drawing Sheets

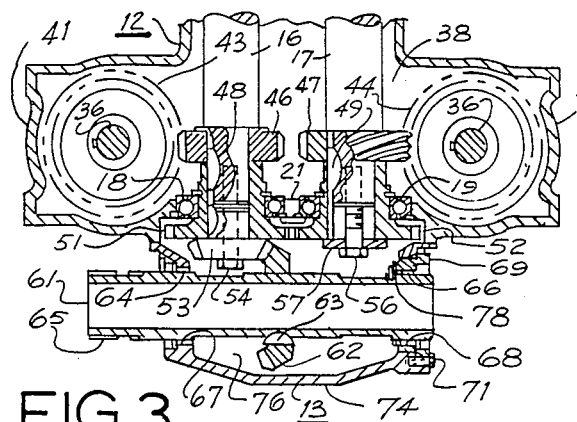
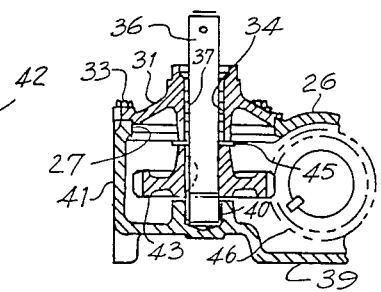
FIG. 3
FIG. 4
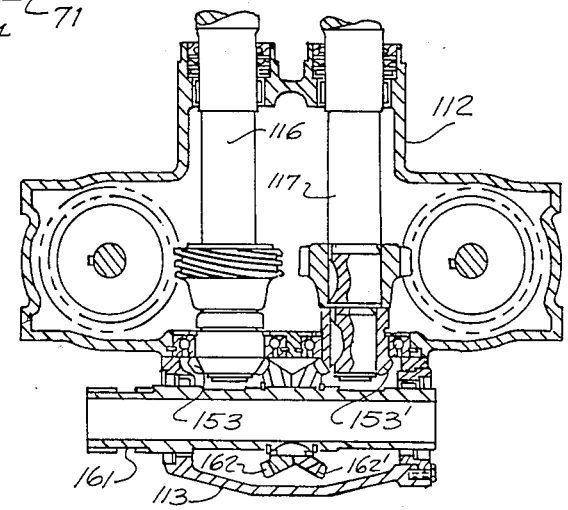
FIG. 5
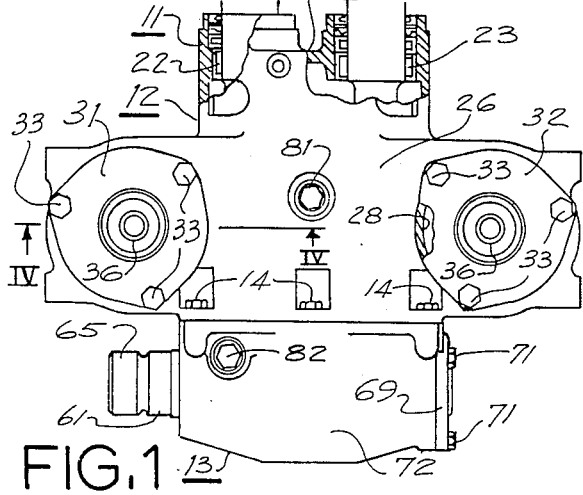
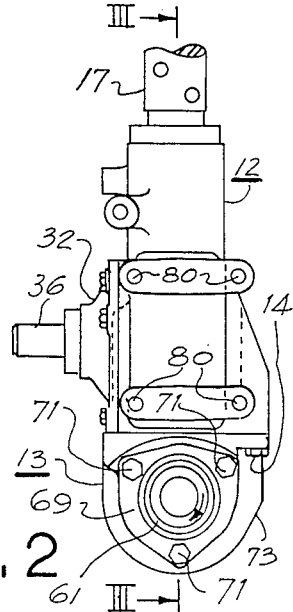
FIG. 1
FIG. 2

CORN HEAD GEAR BOX

TECHNICAL FIELD

This invention relates to a gear box assembly for a corn head of the type used on a combine.

PRIOR ART STATEMENT

U.S. Pat. No. 4,434,606 issued Mar. 6, 1984 to Lawrence G. Rhodes and John W. Carter on a Gear Box for Corn Harvesting Unit shows a two-piece die cast gear case divided on a plane through the axes of the input shaft and the parallel husking roll shafts. Production of such gear cases requires expensive precise dies and special manufacturing "know-how." The various components of this prior art gear box must be held to very precise tolerances because it is not convenient to compensate for manufacturing deviations by shims or the like. As shown in FIG. 9 of the drawings of U.S. Pat. No. 4,434,606, the gear box is secured to cantilevered support arms by bolts. These bolts connect to both the upper half and the lower half of the gear box. Thus, when inspection or replacement of internal components is required at least one-half of the gear box must be removed from the support arms.

OBJECTS AND BRIEF SUMMARY OF THE INVENTION

It is a primary object of this invention to provide a gear box for a corn head having a gear casing which can be fabricated with inexpensive tooling and well known machine shop manufacturing techniques.

It is a further object of this invention to provide a gear box permitting inspection or replacement of certain internal components without requiring removal of the gear box from the corn head.

The gear box of this invention is made up of two end-to-end casings releasably secured to one another by releasable fasteners. In the preferred embodiment, the input shaft with its input gearing is housed in one casing and the snapping roll shafts, the gathering chain sprocket shafts, and the gearing driving same, are housed in a second casing. The input shaft may carry a pair of bevel gears which mesh with bevel gears on the supported ends of the snapping roll shafts. The snapping roll shafts may drive the gathering chain sprocket shafts through worm or helical gear sets or through a spur gear and bevel gear arrangement. In one embodiment of the invention a single bevel gear set transmits power from the input shaft to one of the snapping roll shafts and a pair of meshing spur gears transmits power from the one snapping roll shaft to the other. In this last mentioned embodiment, power is transmitted to the gathering chain sprocket shafts by sets of helical or worm gears.

BRIEF DESCRIPTION OF THE DRAWINGS

Three embodiments of the invention are illustrated in the drawings, in which:

FIG. 1 is a top view of a gear box incorporating a first embodiment of the invention with parts broken away for illustration purposes;

FIG. 2 is a side view of the gear box shown in FIG. 1;

FIG. 3 is a partial view taken on the line III—III in FIG. 2;

FIG. 4 is a partial view taken on the line IV—IV in FIG. 1;

FIG. 5 is a view similar to FIG. 3 but showing a second embodiment of the invention;

DETAILED DESCRIPTION OF THE DRAWINGS

Figure 8:
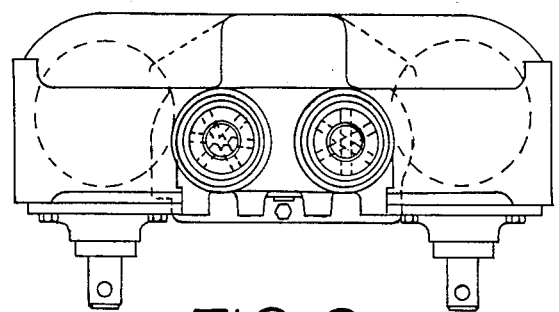
FIG. 8 is an end view taken on the line VIII—VIII in FIG. 6.

The gear box 11, of the embodiment of the invention as shown in FIGS. 1-4, includes a first or main casing 12 and a second casing 13 which is releasably secured to the rear end of the first casing by cap screws 14. The rear ends of a pair of parallel snapping roll shafts 16, 17 are rotatably supported by ball bearings 18, 19 mounted in openings in the rear wall 21 of the casing 12 and the snapping roll shafts 16, 17 are rotatably supported intermediate their opposite ends by sleeve bearings 22, 23 mounted in openings in the front wall 24 of the casing 12. The top wall 26 of the casing 12 presents a pair of annular vertical openings 27, 28 which are covered by a pair of closures 31 releasably secured to the casing 12 by cap screws 33. The closures 31 each have a vertical hole or bore 34 through which extend parallel sprocket shafts 36 for gathering chains. The sprocket shafts 36 are rotatably supported on laterally spaced parallel vertical axes, on the outboard sides of the snapping roll shafts 16, 17, by sleeve bearings 37 mounted in the closures 31, 32 and the lower ends of the shafts 36 are supported in sleeve bearings 40, only one of which is shown, mounted in the bottom wall 39 of the casing 12. The upper ends of the shafts 36 are adapted to receive sprockets, not shown, for driving gathering chains, not shown.

Within the interior cavity 38, formed by the rear wall 21, the front wall 24, the top wall 26, a bottom wall 39 and laterally opposite side walls 41, 42, helical gears 43, 44 are secured for rotation with the shafts 36 by Woodruff keys. As shown in FIG. 4, a replaceable axial thrust bearing in the form of a washer 45 is mounted on the shaft 36 and is interposed between an axially facing surface on the inside of the closure 31 and the gear 43. The releasable closures 31, 32 permit removal of the shaft 36, and the accompanying gear and axial thrust bearing, so that the gear and axial thrust bearing on the shaft can be inspected and replaced, if excessively worn. The helical gears 43, 44 mesh with helical gears 46, 47 secured for rotation with the snapping roll shafts 16, 17 by Woodruff keys 48, 49. A pair of spur gears 51, 52 are secured for rotation with the shafts 16, 17 by the same Woodruff keys 48, 49 which extend across the common plane on which gears 46, 47 abut gears 51, 52. As shown in FIG. 3, the rear end of shafts 16, 17 are supported in the rear wall 21 of the casing 12 through the bearings 18, 19 being mounted on axially extending collars of the spur gears 51, 52. A bevel gear 53 is secured to the rear end of the snapping roll shaft 16 by a Woodruff key interposed between an axially extending cylindrical part of the gear 35 and the spur gear 51. The gears 46, 51 and 53 are held axially in place on the rear end of the snapping roll shaft 16 by a cap screw 54. In a similar manner a cap screw 56 and washer 57 hold the gears 47 and 52 on the rear end of snapping roll shaft 17.

A hollow input shaft 61 has a bevel gear 62 nonrotatably secured thereto by a key 63 and the bevel gear 62 meshes with the bevel gear 53. An exterior driving spline 65 is formed on one end of the input shaft 61 and a pair of sleeve bearings 64, 66 rotatably support the input shaft 61 in laterally opposite side walls of the casing 13. The bearing 64 is mounted in an annular hole or opening 67 in one lateral side wall of the casing 13 and the bearing 66 is mounted in an annular hole or opening 68 in a bearing support 69 which is secured to the other lateral side wall of the casing 13 by cap screws. A top wall 72, a bottom wall 73, a rear wall 74 and opposite lateral side walls of the casing 13 define an interior pocket 76 which is open on its front side which faces the rear end of the main casing 12. An axial thrust washer 78 is mounted on the input shaft 61 in axially engaging relation to the inside surface of the bearing support 69 and is prevented from moving in the axial direction toward the bevel gear 62 by an annular snap ring which fits in a complementary annular groove in the radially outer surface of the input shaft 61. Another snap ring on the shaft 61 prevents axial shifting movement of the bevel gear 62 relative to the input shaft 61 in the direction away from the bevel gear 53, that is, in a direction toward the thrust washer 78. It will be noted that the axes of the input and snapping roll shafts 61, 16, 17 are coplanar.

Fill plugs 81, 82 are provided in the top walls of the casings 12, 13 to facilitate adding grease or other lubricant to the interior of the casings 12, 13. As shown in FIG. 2, four threaded bores 80 are provided on each lateral side of the gear box to receive cap screws by which the gear box is secured to the frame or support members of a corn head.

FIG. 5 illustrates a second embodiment of the invention in which a pair of back-to-back bevel gears 162, 162' are mounted on an input shaft 161 and a mating pair of bevel gears 153, 153' are nonrotatably mounted on the snapping roll shafts 116, 117. In this arrangement the spur gears 51, 52 are not required. Similar to the embodiment of FIGS. 1-4, the casing 113 is releasably secured to the casing 112 by cap screws, not shown.

Figure 9:
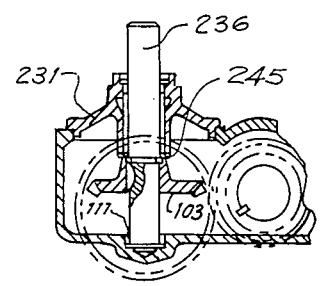
FIG. 9 is a view taken on the line IX—IX in FIG. 6.
Figure 10:
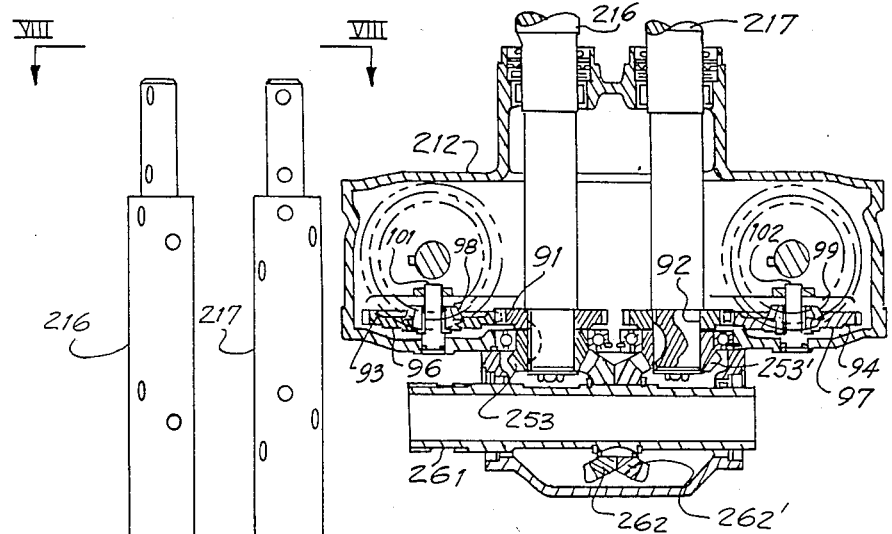
FIG. 10 is a view taken on the line X—X in FIG. 7.
Figure 6:
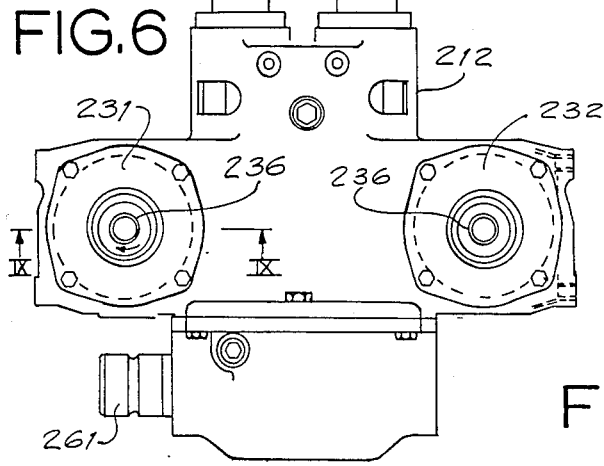
FIG. 6 is a top view of a gear box incorporating a third embodiment of the invention.
Figure 7:
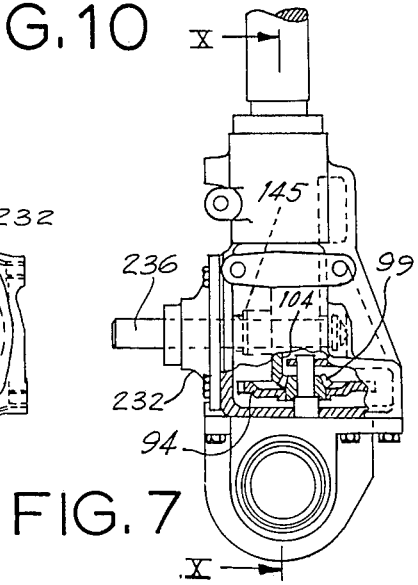
FIG. 7 is a side view of the gear box shown in FIG. 6 with parts broken away for illustration purposes.

Referring to FIGS. 6-10, in which a third embodiment of the invention is illustrated, a back-to-back pair of bevel gears 262, 262' are keyed to rotate with the input shaft 261 and to mesh with mating bevel gears 253, 253' nonrotatably secured to the rear ends of the snapping roll shafts 216, 217. Spur gears 91, 92 are nonrotatably keyed to the snapping roll shafts within the casing 212 and mesh with spur gears 93, 94 of gear clusters 96, 97 which also include bevel gears 98, 99. The gear clusters 96, 97 are rotatably supported on stationary shafts 101, 102 mounted in the casing 212. The bevel gears 98, 99 mesh with bevel gears 103, 104 nonrotatably secured to the sprocket shafts 236 and axial thrust bearings 245 are interposed between the bevel gears 103, 104 and the gear support closures 231, 232. The lower end of each of the shafts 236 is rotatably supported by a sleeve bearing 111 mounted in the bottom wall of the casing 212.

In all three embodiments of the invention the gear box includes first and second casings releasably secured in one another in an end-to-end relationship. The casings are designed to permit casting by standard methods and are readily machined with tools having moderate capitalization costs. The thrust bearings, gears and bearings on the gathering chain shafts can be replaced without removing the gear box casings from the corn head. Also, if necessary, it is relatively easy to use shims to change the axial position of gears to compensate for build-up of tolerances.

The embodiments of the invention in which an exclusive property or privilege is claimed are defined as follows:

1. A gear box for a corn head of a combine comprising
   a first casing having
      a top wall, a bottom wall, a front wall, a back wall and a pair of laterally opposite side walls, said walls defining a hollow interior cavity and
      first and second pairs of aligned openings in said front and back walls, respectively,
   a pair of parallel snapping roll shafts extending in a fore and aft direction on axes defining a horizontal plane
   a bearing mounted in each of said first and second pairs of openings and rotatably supporting said snapping roll shafts
   a pair of parallel gathering chain sprocket shafts,
   a pair of vertical openings in said top wall,
   a pair of closures for said vertical openings releasably secured to said top wall and each presenting a central vertical hole
   a bearing in each of said vertical holes rotatably mounting said sprocket shafts on laterally spaced vertical axes spaced laterally outward of said snapping roll shafts, respectively,
   a second casing releasably secured to the rear wall of said first casing and having
      a top wall, a bottom wall, a rear wall and a pair of laterally spaced side walls defining an interior pocket open at its front, and
      horizontally aligned openings in said lateral side walls,
   an input shaft extending through said aligned openings in said lateral side walls,
   a pair of bearings mounted in said aligned openings in said lateral side walls rotatably supporting said input shaft on horizontal axis transverse to said snapping roll shafts and transverse to said sprocket shafts,
   first power transmitting gearing on said input shaft and snapping roll shafts operable to transmit torque from said input shaft to said snapping roll shafts and
   second power transmitting gearing on said snapping roll shafts and said sprocket shafts operable to transmit torque from said snapping roll shafts to said sprocket shafts.

2. The gear box of claim 1 wherein said second power transmitting gearing includes a gear nonrotatably secure to a portion of each of said sprocket shafts extending into said interior cavity and further comprising an axial thrust bearing between each of said gears and its associated closure.

3. The gear box of claim 1 wherein said first power transmitting gearing includes at least one bevel gear set on said input shaft and one of said snapping roll shafts and wherein said second power transmitting gearing includes sets of helical gears on said snapping roll shafts and sprocket shafts.

4. The gear box of claim 3 wherein said first power transmitting gearing includes spur gears on said snapping roll shafts meshing with one another and operable to transmit torque from one snapping roll shaft to the other.

5. The gear box of claim 4 wherein said spur gears are disposed on the rear of said rear wall of said first casing.

6. The gear box of claim 5 wherein said spur gears are rotatably supported by said bearings rotatably supporting the rear ends of said snapping roll shafts.

7. The gear box of claim 4 wherein removable axial thrust bearings are disposed between said helical gears on said sprocket shafts and said closures.

8. The gear box of claim 3 wherein said first power transmitting gearing includes back-to-back bevel gears nonrotatably secured to said input shaft and bevel gears on the rear ends of said snapping roll shafts meshing with said back-to-back bevel gears.

9. The gear box of claim 1 wherein said first power transmitting gearing includes back-to-back bevel gears nonrotatably secured to said input shaft and bevel gears on the rear ends of said snapping roll shafts mating with said back-to-back bevel gears and wherein said second power transmitting gearing includes a first spur gear on each of said snapping roll shafts, a pair of intermediate stationary shafts, second spur gears rotatably mounted, respectively, on said stationary shafts and meshing with said first spur gears, driving bevel gears secured, respectively, to said second spur gears and driven bevel gears nonrotatably secured to said sprocket shafts, respectively, and meshing, respectively, with said driving bevel gears.

* * * * *